US008807935B2

(12) United States Patent
Chu et al.

(10) Patent No.: US 8,807,935 B2
(45) Date of Patent: Aug. 19, 2014

(54) FAN FRAME AND WIRE ARRANGEMENT MECHANISM THEREOF

(75) Inventors: Xue-Wei Chu, Taoyuan Hsien (TW); Heng-Guo Yang, Taoyuan Hsien (TW); Yung-Ping Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1005 days.

(21) Appl. No.: 11/409,970

(22) Filed: Apr. 25, 2006

(65) Prior Publication Data

US 2007/0134091 A1 Jun. 14, 2007

(30) Foreign Application Priority Data

Dec. 13, 2005 (TW) .............................. 94221717 U

(51) Int. Cl.
*F04D 19/00* (2006.01)
*F04D 29/54* (2006.01)

(52) U.S. Cl.
USPC ..... 415/220; 415/121.3; 415/232; 417/423.1; 417/423.14; 310/71; 174/68.1; 174/68.3; 174/72 A; 174/97

(58) Field of Classification Search
USPC ................. 415/121.3, 220, 222, 223, 232; 416/170 R; 417/423.1, 423.14, 423.15; 310/67 R, 71; 174/68.1, 68.3, 72 A, 97, 174/101
See application file for complete search history.

(56) References Cited

U.S. PATENT DOCUMENTS 5,189,327 A * 2/1993 Ootsuka et al. ............... 310/71
6,174,145 B1 * 1/2001 Taniguchi ................ 417/423.14

* cited by examiner

*Primary Examiner* — Christopher Verdier
(74) *Attorney, Agent, or Firm* — Birch, Stewart, Kolasch & Birch, LLP

(57) ABSTRACT

A wire arrangement mechanism including a guiding slot and an arranging slot is formed on a fan frame. The guiding slot includes a bottom wall and two holding walls extending therefrom. The arranging slot is defined by an outer frame and a confining portion connected thereto. The arranging slot is staggered from and communicated with the guiding slot.

16 Claims, 12 Drawing Sheets

FAN FRAME AND WIRE ARRANGEMENT MECHANISM THEREOF

BACKGROUND OF THE INVENTION

1. Field of the Invention

The invention relates to a wire arrangement mechanism of a fan frame, and in particular to a wire arrangement mechanism preventing a power wire from separating from a fan frame.

2. Description of the Related Art

A power wire of a heat-dissipation fan is often gathered by a wire arrangement mechanism and then connected to a power source in electronic equipment. The wire arrangement mechanism may be formed on ribs of a frame of the heat-dissipation fan to fix and protect the power wire. By the wire arrangement mechanism, the power wire is not separated from or drawn into the heat-dissipation fan due to vibration or wind force during operation thereof. Moreover, by the wire arrangement mechanism, the power wire is not separated from a motor of the heat-dissipation fan due to unexpected drag when the heat-dissipation fan is assembled in the electronic equipment.

FIG. 1 is a partial perspective view of a wire arrangement mechanism of a conventional fan. The wire arrangement mechanism comprises a guiding slot 10 and an arranging slot 12. The guiding slot 10 is formed on a rib of a frame of the fan. The arranging slot 12 is formed on an air outlet side of the frame and corresponds exactly to an end of the guiding slot 10. As shown in FIG. 2 and FIG. 3, a power wire 2 is disposed in the guiding slot 10. As the arranging slot 12 corresponds exactly to the guiding slot 10, the wire arrangement mechanism is not a closed structure. When subject to improper force, the power wire 2 will be easily separated from the frame through the arranging slot 12, adversely affecting assembly of the fan and the electronic equipment.

Hence, there is a need for a wire arrangement mechanism preventing a power wire from separating from a fan frame.

BRIEF SUMMARY OF THE INVENTION

A detailed description is given in the following embodiments with reference to the accompanying drawings.

An exemplary embodiment of the invention provides a wire arrangement mechanism comprising a guiding slot and an arranging slot. The guiding slot is formed by a bottom wall and two holding walls extending therefrom. The arranging slot is formed and defined by an outer frame and a confining portion connected thereto. The arranging slot is staggered from and communicated with the guiding slot.

The confining portion is integrally formed with the outer frame and extends therefrom.

One edge of the outer frame connected to the confining portion is coplanar or non-coplanar to the bottom wall of the guiding slot.

The outer frame comprises a recess with one side thereof formed by the confining portion.

The recess corresponds to the guiding slot.

The recess and the guiding slot form a closed area from a side view of the wire arrangement mechanism.

Another exemplary embodiment of the invention provides a fan frame comprising an outer frame, a base, a plurality of ribs, and a wire arrangement mechanism. The base is disposed in the outer frame. The ribs connect the outer frame and the base. The wire arrangement mechanism comprises a guiding slot and an arranging slot. The guiding slot is formed on one of the ribs. The arranging slot is formed on the outer frame and staggered from and communicated with the guiding slot.

The guiding slot comprises a bottom wall and two holding walls extending therefrom.

The fan frame further comprises a confining portion extending from the arranging slot on the outer frame.

The confining portion extends toward one side of the outer frame.

One edge of the outer frame connected to the confining portion locates more toward the interior or exterior of the fan frame than the bottom wall of the guiding slot, from a side view of the wire arrangement mechanism.

Otherwise, one edge of the outer frame connected to the confining portion is coplanar to the bottom wall of the guiding slot.

The outer frame comprises a recess with one side thereof formed by the confining portion.

The recess corresponds to the guiding slot.

The recess and guiding slot form a closed area from a side view of the wire arrangement mechanism.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
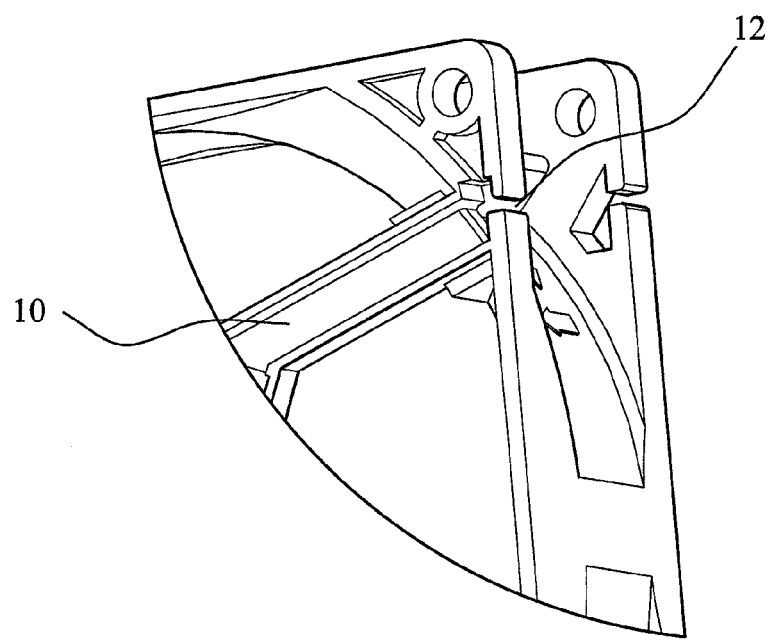
FIG. 1 is a partial perspective view of a wire arrangement mechanism of a conventional fan.
Figure 2:
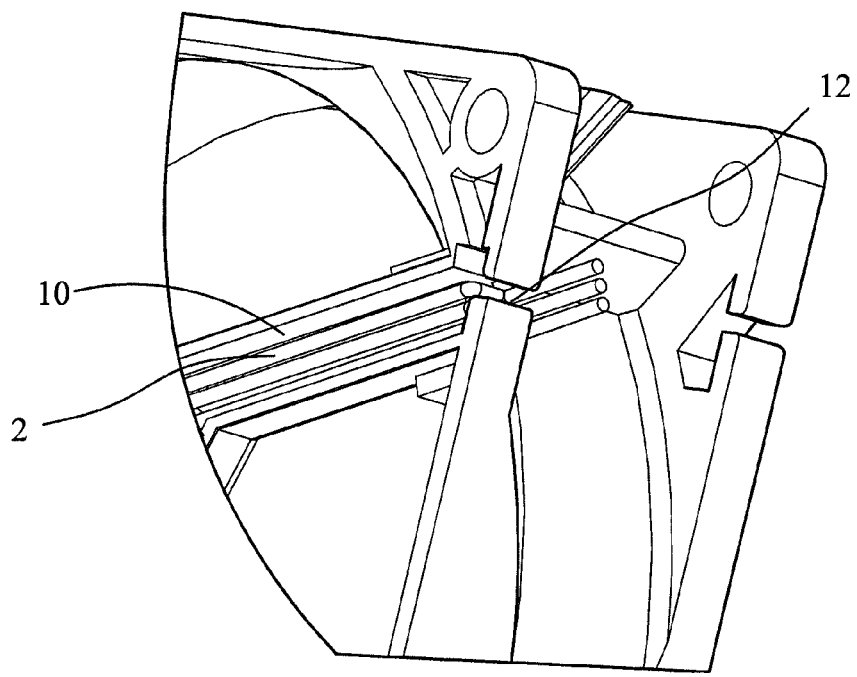
FIG. 2 is a partial perspective view showing a power wire disposed in the wire arrangement mechanism of FIG. 1.
Figure 3:
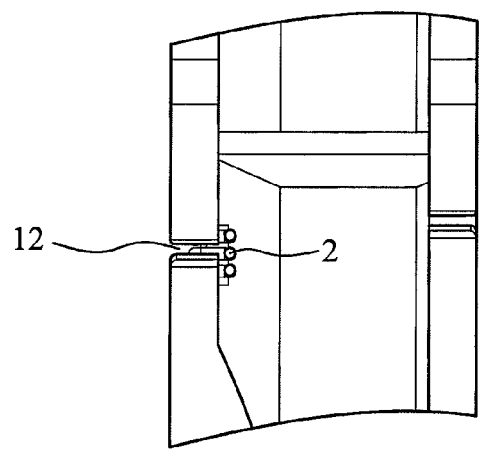
FIG. 3 is a schematic side view of FIG. 2.
Figure 4:
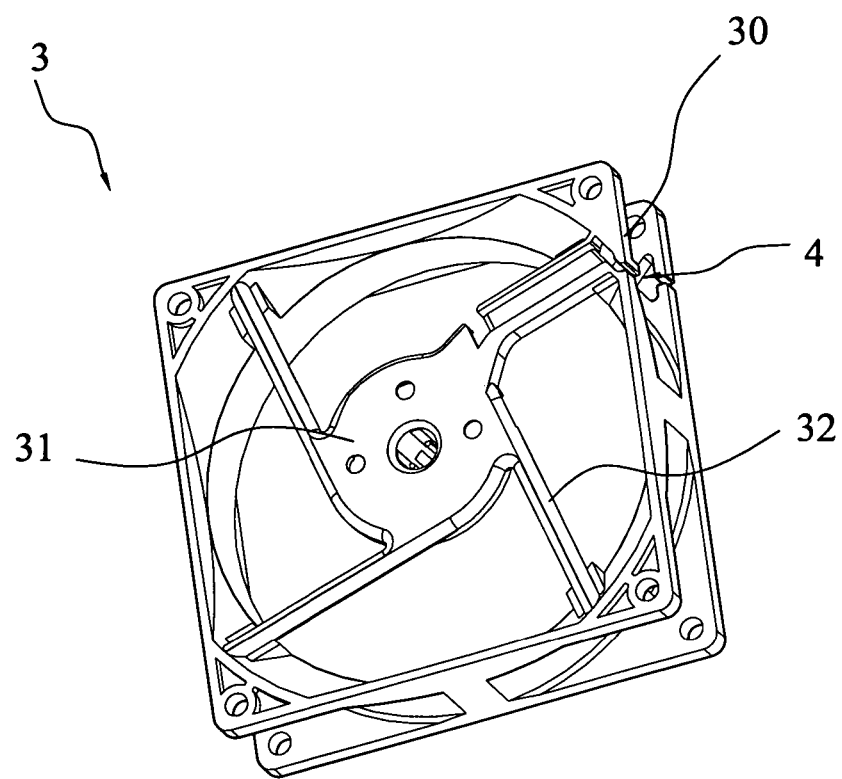
FIG. 4 is a perspective view of a fan frame according to a first embodiment of the invention.

Referring to FIG. 4, a fan frame 3 comprises an outer frame 30, a base 31, and a plurality of ribs 32. The base 31 is disposed in the outer frame 30 at an air outlet side. The ribs 32 connect the outer frame 30 and the base 31.

Figure 5:
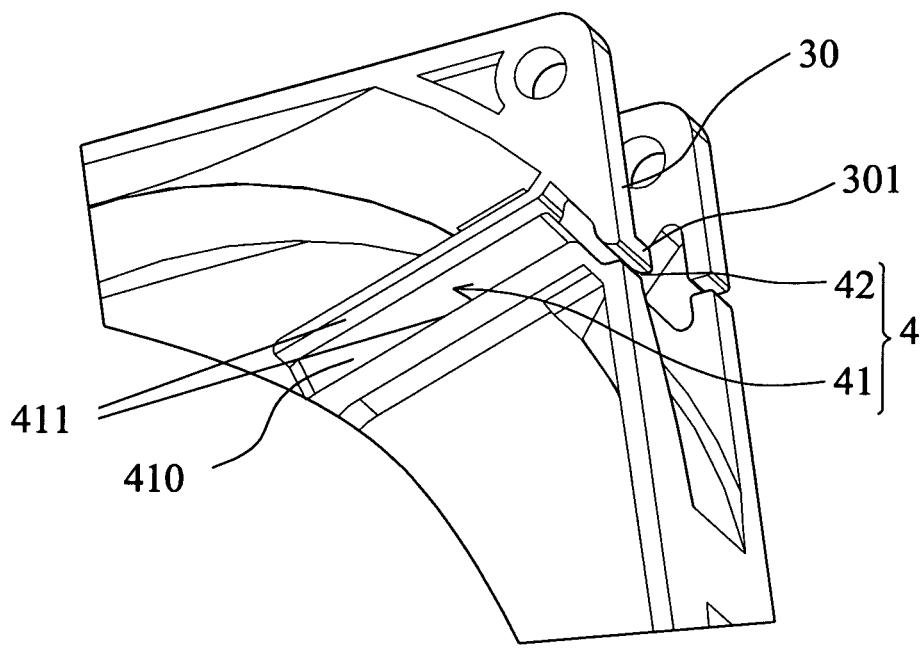
FIG. 5 is a partial perspective view of a wire arrangement mechanism of FIG. 4.

As shown in FIG. 4 and FIG. 5, a guiding slot 41 is formed on one of the ribs 32. An arranging slot 42 is formed on the outer frame 30 at the air outlet side. The guiding slot 41 is communicated with the arranging slot 42. The opening of the arranging slot 42 does not correspond exactly to an end of the guiding slot 41. Namely, the arranging slot 42 is staggered from the guiding slot 41. Moreover, the guiding slot 41 and arranging slot 42 form a wire arrangement mechanism 4.

Specifically, the guiding slot 41 is formed by a bottom wall 410 and two holding walls 411 extending from two ends thereof. The bottom wall 410 is on the rib 32. A confining portion 301 extends from the outer frame 30 at the arranging slot 42. Additionally, the confining portion 411 extends toward an air inlet side of the fan frame 3.

Figure 6:
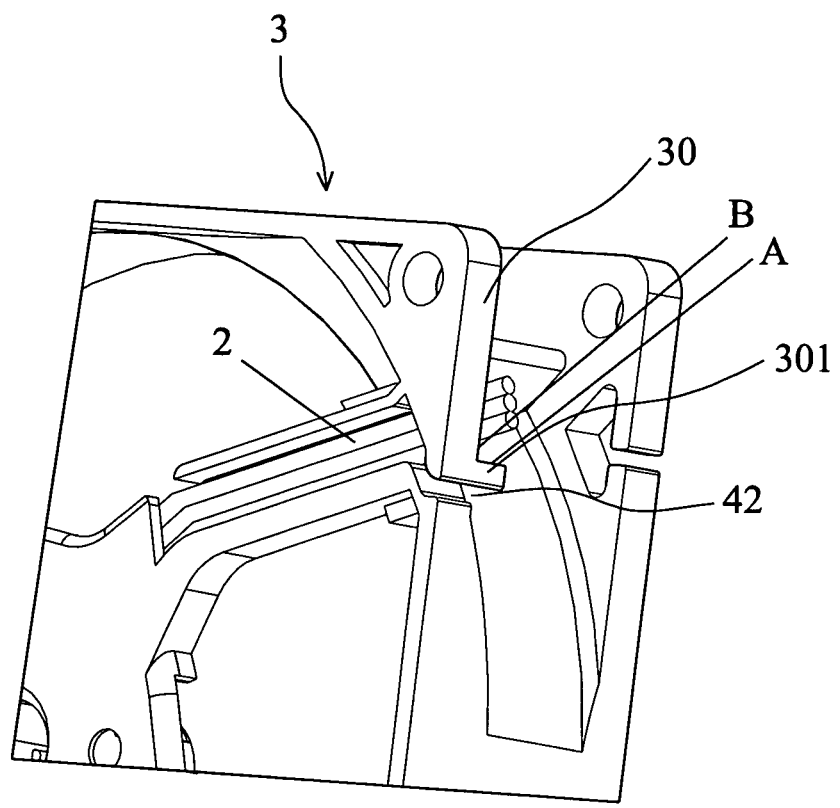
FIG. 6 is a perspective view showing a power wire disposed in the wire arrangement mechanism of FIG. 5.

As shown in FIG. 5 and FIG. 6, when disposed in the wire arrangement mechanism 4, a power wire 2 is horizontally placed on the guiding slot 41 and confined by the holding walls 411 thereof, and extends to the outside of the fan frame 3. As the arranging slot 42 is staggered from the guiding slot 41 and the confining portion 301 stops the power wire 2 from moving toward the arranging slot 42, the power wire 2 does not easily separate from the wire arrangement mechanism 4.

Figure 7:
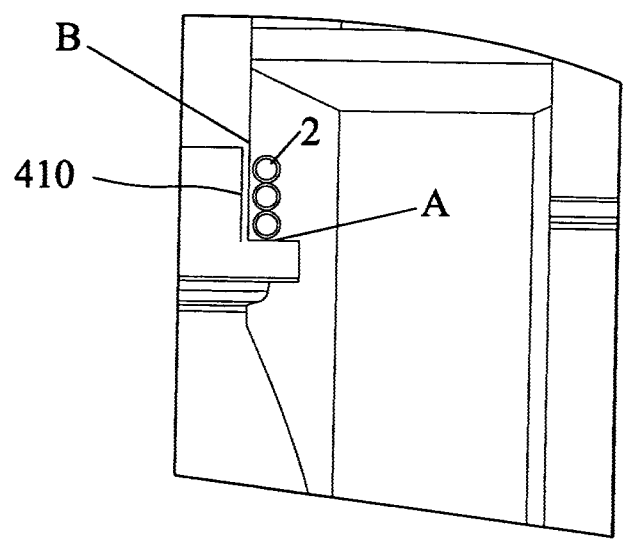
FIG. 7 is a schematic side view of FIG. 6.

As shown in FIG. 6 and FIG. 7, from a side view of the wire arrangement mechanism 4, an edge A of the confining portion 301 facing the power wire 2 and an edge B of the fan frame 3 connected to the edge A locate more toward the interior of the fan frame 3 than the bottom wall 410 of the guiding slot 41 so as to effectively encompass and fix the power wire 2. Specifically, the aforementioned structure will cause the power wire 2 to bend.

Figure 8:
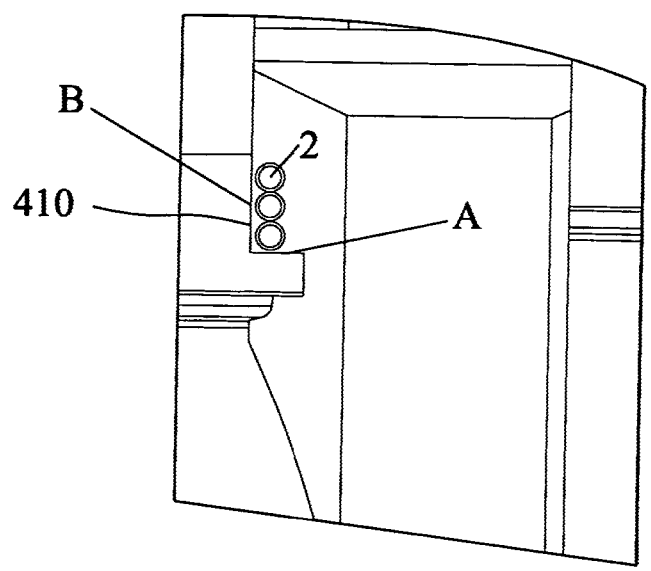
FIG. 8 is a another schematic side view showing a edge of the fan frame and a bottom wall of a guiding slot of FIG. 6.
Figure 9:
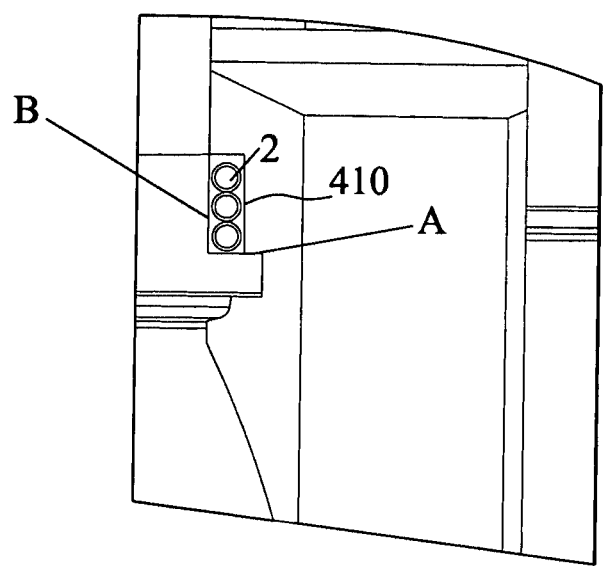
FIG. 9 is still another schematic side view showing a edge of the fan frame and a bottom wall of a guiding slot of FIG. 6.

To avoid excessive bending of the power wire 2, the edge B can be coplanar to the bottom wall 410, as shown in FIG. 8, or the bottom wall 410 faces more toward the interior of the fan frame 3 than the edge B, as shown in FIG. 9. Accordingly, the confining portion 301 can effectively prevent the power wire 2 from moving to the arranging slot 42 to separate away.

Figure 10:
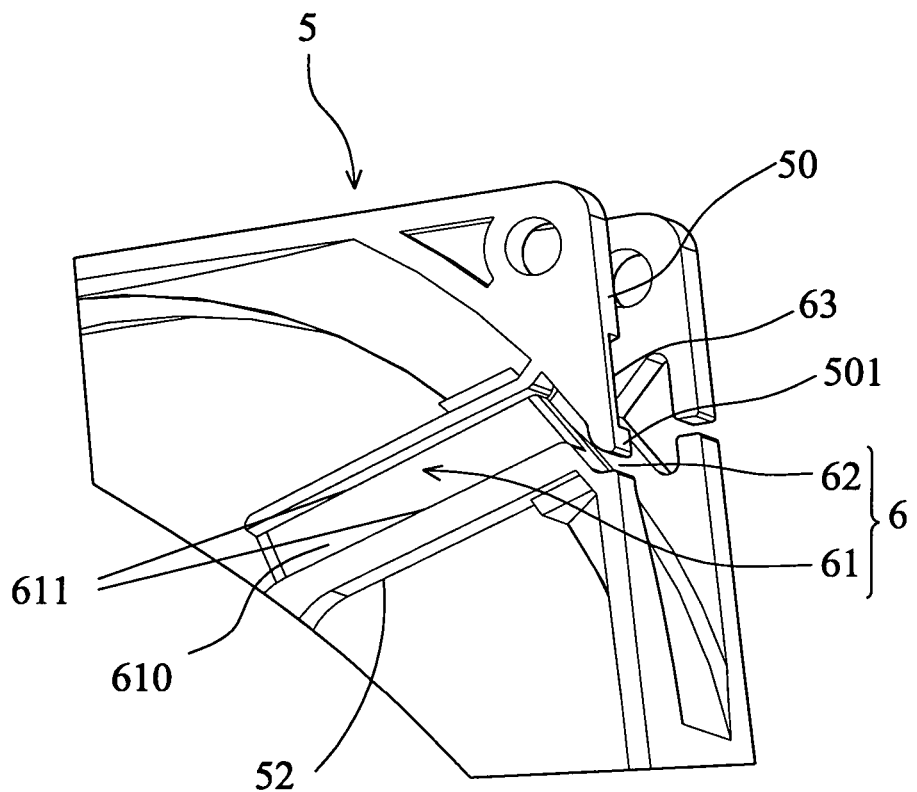
FIG. 10 is a perspective view of another wire arrangement mechanism according a second embodiment of the invention.

Referring to FIG. 10, another fan frame 5 according to the present invention comprises a wire arrangement mechanism 6. The wire arrangement mechanism 6 comprises a guiding slot 61 formed on a rib 52 and an arranging slot 62 formed on an outer frame 50 at an air outlet side. The guiding slot 61 is communicated with the arranging slot 62. The opening of the arranging slot 62 does not correspond exactly to an end of the guiding slot 61. Namely, the arranging slot 62 is staggered from the guiding slot 61.

Specifically, the guiding slot 61 is formed by a bottom wall 610 and two holding walls 611 extending from two ends thereof. The bottom wall 610 is on the rib 52. The outer frame 50 comprises a recess 63 corresponding exactly to the guiding slot 61. A confining portion 501 is formed between the recess 63 and the arranging slot 62 and extends toward an air inlet side of the fan frame 5.

Figure 11:
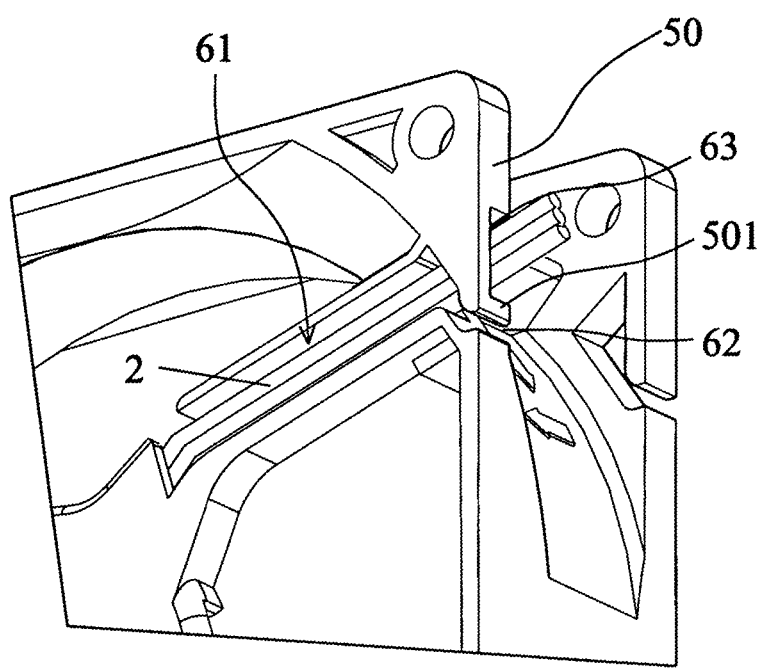
FIG. 11 is a perspective view showing a power wire disposed in the wire arrangement mechanism of FIG. 10.

As shown in FIG. 10 and FIG. 11, when disposed in the wire arrangement mechanism 6, a power wire 2 is horizontally placed on the guiding slot 61 and confined by the holding walls 611 thereof, and extends through the recess 63. As the arranging slot 62 is staggered from the guiding slot 61 and the confining portion 501 stops the power wire 2 from moving toward the arranging slot 62, the power wire 2 is not easily separated from the wire arrangement mechanism 6.

Figure 12:
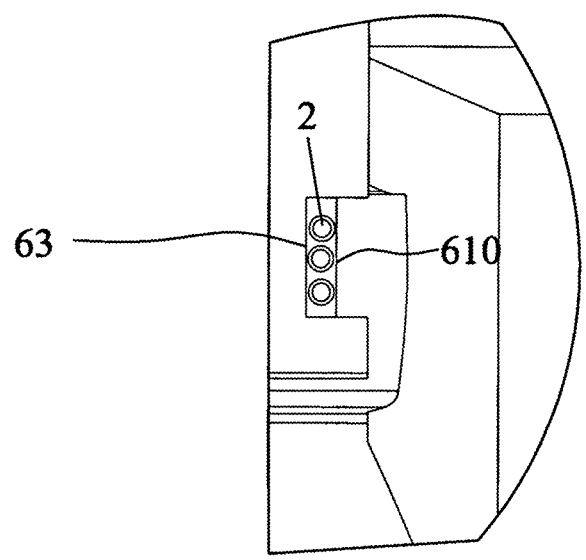
FIG. 12 is a schematic side view of FIG. 11.

As shown in FIG. 11 and FIG. 12, from a side view of the wire arrangement mechanism 6, the recess 63 and bottom wall 610 of the guiding slot 61 form a closed area to effectively encompass and fix the power wire 2.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wire arrangement mechanism of a fan, wherein an air flow created by the fan flows along an axis, the wire arrangement mechanism comprising:
   a guiding slot defined by a bottom wall and two holding walls extending from the bottom wall; and
   an arranging slot formed in an outer frame penetrating therethrough and defined by an upper portion of the outer frame and a lower portion of the outer frame, wherein the arranging slot is staggered from and communicated with the guiding slot, a confining portion extends from the upper portion of the outer frame and protrudes out of the outer frame toward a direction parallel to the axis, and the outer frame comprises a recess with one side formed by the confining portion, the confining portion preventing a power wire received in the guiding slot from moving to the arranging slot to separate away from the outer frame to the outside of the outer frame.

2. The wire arrangement mechanism as claimed in claim 1, wherein the confining portion is integrally formed with the outer frame and extends from the outer frame.

3. The wire arrangement mechanism as claimed in claim 1, wherein one edge of the outer frame connected to the confining portion is coplanar or non-coplanar to the bottom wall of the guiding slot.

4. The wire arrangement mechanism as claimed in claim 1, wherein the recess corresponds to the guiding slot.

5. The wire arrangement mechanism as claimed in claim 4, wherein the recess and guiding slot form a closed area from a side view of the wire arrangement mechanism.

6. A fan frame of a fan, comprising:
   an axis, wherein an air flow created by the fan flows along the axis;
   an outer frame comprising a recess;
   a base mounted in the outer frame;
   a plurality of ribs disposed between the outer frame and the base; and
   a wire arrangement mechanism comprising a guiding slot and an arranging slot, wherein the guiding slot is formed on one of the ribs, the arranging slot is formed in the outer frame penetrating therethrough and defined by an upper portion of the outer frame and a lower portion of the outer frame, the arranging slot being staggered from and communicated with the guiding slot, a confining portion connected to the outer frame extends from the upper portion of the outer frame and protrudes out of the outer frame toward a direction parallel to the axis, and one side of the recess is formed by the confining portion, the confining portion preventing a power wire received in the guiding slot from moving to the arranging slot to separate away from the outer frame to the outside of the outer frame.

7. The fan frame as claimed in claim 6, wherein the guiding slot comprises a bottom wall and two holding walls extending from the bottom wall.

8. The fan frame as claimed in claim 6, further comprising the confining portion extending from the arranging slot toward one side of the outer frame.

9. The fan frame as claimed in claim 8, wherein from a side view of the wire arrangement mechanism, one edge of the outer frame connected to the confining portion locates more toward the interior or exterior of the fan frame than a bottom of the guiding slot, or locates at a same plane with the bottom of the guiding slot.

10. The fan frame as claimed in claim 6, wherein the recess corresponds to the guiding slot.

11. The fan frame as claimed in claim 10, wherein the recess and guiding slot form a closed area from a side view of the wire arrangement mechanism.

12. A fan frame of a fan, comprising:
an axis, wherein an air flow created by the fan flows along the axis;
an outer frame comprising a recess, an air outlet side, and a confining portion formed on the air outlet side;
a base disposed in the outer frame at the air outlet side;
a plurality of ribs connecting the outer frame and the base; and
a wire arrangement mechanism comprising a guiding slot and an arranging slot, wherein the guiding slot is formed on one of the ribs, the arranging slot is formed in the outer frame penetrating therethrough and defined by an upper portion of the outer frame and a lower portion of the outer frame, the arranging slot being staggered from and communicated with the guiding slot, the confining portion connected to the outer frame extends from the upper portion of the outer frame and protrudes out of the outer frame toward a direction parallel to the axis, and one side of the recess is formed by the confining portion, the confining portion preventing a power wire received in the guiding slot from moving to the arranging slot to separate away from the outer frame to the outside of the outer frame.

13. The fan frame as claimed in claim 12, wherein the confining portion extends toward the other side of the outer frame.

14. The fan frame as claimed in claim 12, wherein from a side view of the wire arrangement mechanism, one edge of the outer frame connected to the confining portion locates more toward the interior or exterior of the fan frame than a bottom of the guiding slot, or locates at a same plane with the bottom of the guiding slot.

15. The fan frame as claimed in claim 12, wherein the recess corresponds to the guiding slot.

16. The fan frame as claimed in claim 15, wherein the recess and guiding slot form a closed area from a side view of the wire arrangement mechanism.

* * * * *